United States Patent [19]

Jaffe

[11] Patent Number: 4,541,872
[45] Date of Patent: * Sep. 17, 1985

[54] PREPARATION OF PIGMENTARY GRADE PIGMENT FROM CRUDE PIGMENT

[75] Inventor: Edward E. Jaffe, Wilmington, Del.

[73] Assignee: Ciba-Ceigy Corporation, Ardsley, N.Y.

[*] Notice: The portion of the term of this patent subsequent to Jun. 19, 2001 has been disclaimed.

[21] Appl. No.: 594,674

[22] Filed: Mar. 26, 1984

Related U.S. Application Data

[63] Continuation-in-part of Ser. No. 390,509, Jun. 21, 1982, abandoned.

[51] Int. Cl.$^4$ .............................................. C09B 48/00
[52] U.S. Cl. ................ 106/309; 106/308 Q; 106/288 Q; 546/49; 546/56; 546/57
[58] Field of Search ............... 106/309, 288 Q, 308 Q; 546/49, 56, 57

[56] References Cited

U.S. PATENT DOCUMENTS 4,455,173  6/1984  Jaffe ................................. 106/288 Q Primary Examiner—Paul Lieberman
Assistant Examiner—Amelia B. Yarbrough
Attorney, Agent, or Firm—Harry Falber

[57] ABSTRACT

Finished grade pigments are prepared from crude pigment precursors by conversion to aggregated low crystallinity pigment followed by milling the aggregated low crystallinity pigment in water having a pH of from 7 to 14 and from 5 to 25% based on pigment of a separate phase comprising an organic liquid which is effective in growing and improving the crystallinity of the pigment particles. The resulting material is extracted in dilute acid, washed free of acid and dried to produce the final finished grade pigment.

13 Claims, No Drawings

PREPARATION OF PIGMENTARY GRADE PIGMENT FROM CRUDE PIGMENT

RELATED APPLICATION

This application is a continuation-in-part of application Ser. No. 390,509, filed June 21, 1982, now abandoned.

BACKGROUND OF THE INVENTION

1. Field of the Invention

The present invention relates to a process for converting crude pigments such as crude quinacridone to an aggregated low crystallinity form followed by conversion to a pigmentary form by milling in the presence of an aqueous base which may contain a salt or an aqueous basic salt and a small amount of an organic liquid at least some of which is present as a distinct second phase.

It is well known in the art that quinacridones as synthesized, known as crude quinacridones, are generally unsuitable for use as pigments and must be further processed to develop the requisite pigmentary properties such as particle size, particle shape, crystalline structure, tinctorial strength, phase, etc. The most commonly used processes for converting crude quinacridones to pigmentary form involve milling the crude quinacridone with large quantities of inorganic salt and then extracting the resulting mill powder. While the salt grinding process produces satisfactory pigment for some applications, it suffers from two important disadvantages. First it involves the use of large quantities of salt which severely limits the amount of pigment which can be charged to the mill and which has to be disposed of and second the resulting pigment particles often are acicular which creates rheological problems in final applications such as high solids acrylic paints for automotive use.

2. Prior Art

Various attempts to eliminate the use of salt in milling crude quinacridones have been made. For instance, in U.S. Pat. No. 2,857,400 crude pigment is premilled in a ball mill, then homogenized in acetone and recovered from the acetone. In U.S. Pat. No. 3,017,414 crude pigment is premilled in a ball mill, then treated with a water-insoluble organic liquid such as chlorobenzene in water emulsion, and recovered from the emulsion.

Another method for preparing pigmentary quinacridone from crude quinacridone, is described in U.S. Pat. No. 3,287,147 wherein the crude quinacridone is either acid pasted or ball milled to provide a product which is formed into a neutral aqueous paste which is then heated at 150° to 300° C. under pressure. Special equipment is required for heating at elevated temperatures and pressure.

U.S. Pat. No. 4,024,148 discloses preparation of a novel crystalline form of quinacridone by conditioning precipitated quinacridone in an aqueous slurry thereof in the presence of a large quantity of a water-insoluble liquid having at least one hydroxyl group and a surfactant. The surfactant is retained on the surface of the pigment.

In still another method (U.S. Pat. No. 4,094,699) which dispenses with the use of organic solvents premilled quinacridone is ripened in an aqueous base in the presence of both cationic and nonionic surfactants. Some of the surfactants are retained on the surface of the pigment and can cause compatibility problems in some end-use systems.

SUMMARY OF THE INVENTION

The present invention involves converting a crude organic pigment such as quinacridones or copper phthalocyanines to an aggregated low crystallinity form such as by premilling followed by milling the resulting material in the presence of an aqueous base, basified aqueous salt solution or basic salt solution, such as $Na_2HPO_4$, or $Na_3PO_4$ and a small amount of an organic liquid at least some of which is present as a separate phase, in the absence or presence of a surfactant to convert the aggregated low crystallinity organic pigment to a readily dispersible pigmentary product.

DETAILED DESCRIPTION

The method of the present invention affords the opportunity to provide quinacridone pigments of essentially any desired particle size and thus control one of the parameters which affect the rheological properties of the product pigment by the exclusion or inclusion of particle size growth promoters or inhibitors. The decision as to whether to utilize a particle size growth promoter or particle size growth inhibitor in the process of the present invention depends on the nature of the pigment being prepared and particularly on the propensity of such pigment to grow particles from the low crystallinity state. In addition, the process of this invention provides the opportunity to further control pigment particle size by varying the kind and amount of solvent in the second phase. Generally the low crystallinity pigment is milled in an aqueous base at pH 7 to 14, preferably pH 9 to 13.5 in the presence of a small amount of organic solvent present as a separate phase. If the organic solvent is soluble in water at a given concentration, a higher concentration of base or the addition of a salt to the aqueous base can be used to force the solvent out of solution which results in greater potential for particle growth.

For instance, when preparing a solid solution consisting of 75% 2,9-dichloroquinacridone and 25% quinacridone, and using a preferred solvent, i.e., n-pentanol, which ordinarily is completely soluble in water, in the amount used at room temperature (at 22° C. n-pentanol dissolves to a solution of 2.7%) the addition of an appropriate amount of base, base and salt or basic salt can force the alcohol out of the solution and thereby render it an effective growth medium for the solid solution. The higher the ionic strength of the aqueous phase the more the alcohol is forced out of solution. Thus in 100 ml of water containing 1.2 g sodium sulfate, 3.7% sodium hydroxide, 41% of 2 ml of n-pentanol is out of solution. If the amount of sodium hydroxide is about doubled to a concentration of 7.3%, 68% of the alcohol is out of solution. In the latter case a product of somewhat larger particle size is realized as judged by the nature of a lithographic varnish rubout. In this case, the milling is done at room temperature. By using a higher milling temperature, increased particle growth is to be expected and conversely lowering the milling temperature decreases the particle growth. Also increasing the milling time can increase the amount of particle growth. Particle size can also be increased by simply varying the amount of organic solvent used while keeping the base concentration constant. Thus when milling 12 g of a 75/25 2,9-dichloroquinacridone/quinacridone pigment containing 1.2 g sodium sulfate with 95 ml water and 7.7 g 50% aqueous sodium hydroxide, the use of 1 ml n-pentanol provides a smaller particle size product than is obtained when using 2 ml of n-pentanol. When using 4 ml of n-pentanol, the particle size increases further to the point where weakness in tinctorial strength is observed. The preferred amount is 1 to 2 ml of n-pentanol. When no n-pentanol is used, a much smaller particle size product is obtained, which usually exhibits significantly poorer dispersibility and rheology. As pointed out above the amount of base used, while keeping the amount of alcohol present constant, can also affect particle size. Thus in the above system if the amount of alcohol used is 2 ml and the amount of 50% aqueous sodium hydroxide is lowered to 3.9 g, the particle size will decrease. Doubling of the sodium hydroxide to 15.4 g 50% aqueous sodium hydroxide increases the particle size without significantly affecting tinctorial strength as judged by a rubout evaluation. The amount of organic liquid required generally can be reduced by increasing the ionic strength of the aqueous phase or by increasing the pH of the aqueous phase. The combination of ionic strength, pH and amount of organic liquid required to produce a pigment having optimum strength and rheology is unique for each kind of pigment and must be determined on a case-by-case basis.

The milling is preferably carried out on the basic side to avoid having acid attack the metal milling media and thus generate hydrogen in the milling operation. However, for water soluble solvent, the ionic strength of the medium determines the amount of alcohol out of solution. Thus it is possible to substitute part of the base with a neutral salt of similar ionic strength and arrive at a product of similar appearance as judged by a rubout evaluation. The aqueous milling can be carried out in the presence of an organic liquid and aqueous base only. The preferred aqueous bases are the alkali metal hydroxides with sodium hydroxide and potassium hydroxide being especially preferred. Alternatively, the aqueous milling can be carried out in a basified aqueous salt solution such as a solution of aluminum sulfate or sodium chloride which has been rendered basic by addition of sodium hydroxide. Alternatively, the aqueous milling can be carried out in a basic salt solution such as a solution of $Na_2HPO_4$ or $Na_3PO_4$.

Since the n-pentanol is partially soluble in the medium during the milling operation, it appears to act as a solvent medium and also as a dispersant, thereby eliminating the need for surfactants which are usually required for the preparation of pigmentary 2,9-dichloroquinacridone and solid solutions thereof with quinacridone, or 2,9-dimethylquinacridone and its solid solutions with quinacridone. If desired, surfactants can be included in the milling operation, depending on their nature and the nature of the pigment, they can aid or hinder the pigment ripening process. For instance, inclusion of 0.5 to 10% by weight based on pigment of quaternary salts such as cetyl trimethyl ammonium chloride or preferably totally water soluble salts like benzyl tributyl ammonium chloride in conjunction with the quinacridones and particularly the above described 75/25 solid solution enhances particle growth considerably. On the other hand surfactants such as dodecylbenzene sulfonic acid or its amine salts and additives such as 2-phthalimidomethylquinacridone in small quantities have a profound effect in retarding particle size growth and providing transparent products.

The inclusion of small quantities of nonionic surfactants such as condensation products of nonylphenol and ethylene oxide can also enhance particle growth in some cases. This has been demonstrated in the preparation of solid solutions consisting of 90% 2,9-dimethylquinacridone and 10% quinacridone, as well as 60% quinacridone and 40% 2,9-dichloroquinacridone.

The use of surfactants is not essential since the milling media used in the aqueous milling step ⅛" (0.0032 m) balls provide sufficient attrition and mixing to form an intimate mixture of the pigment and the aqueous and non-aqueous phases.

When it is desirable from a specific end use point of view, surfactants can be included. For greater universality of application, surfactant-free pigments may be desirable. This process is suitable for the preparation of such pigments. The inclusion of 2-phthalimidomethylquinacridone in even small quantities has a profound effect on the particle size of the resulting product. This particle size growth inhibitor can be included in the liquid milling step or in the earlier step of premilling. The efficiency of growth inhibiting action is enhanced when it is included in the premilling operation. Using this approach, small particle size, surfactant-free products can be prepared.

Particle size control of solid solution quinacridone pigments is difficult in the prior art dispersion milling process as described in U.S. Pat. No. 3,030,370, since it is dependent on the ripening and extraction step in dilute sulfuric acid which is relatively ineffective in growing the particles from low crystallinity material generated in a long and effective dispersion milling step. Undermilling cannot be used to correct this, since it leads to products exhibiting incomplete solid solution formation. Under conditions of the present invention, complete solid solution is usually achieved at various levels of particle sizes of the final pigmentary product. The process of the present invention can provide the variables required to obtain a desired particle size pigment over a wide range of particle sizes either by inclusion of a particle size growth restraining agent or by modifying the organic liquid used so as to control its effect on the particular quinacridone being used. Thus the process of the present invention can be used to prepare relatively large particle size pigments which still have the high tinctorial strength usually associated with small particle size pigments but which exhibit excellent lightfastness usually associated with the larger particle size pigments.

Another advantage of the present invention is that the use of surfactants can be avoided if they are known to interfere in some end use applications.

Any organic liquid which is either insoluble in water or can be made to come out of solution to form a separate phase by salting out and can grow particles from the low crystallinity state to pigmentary grade material can be used. Totally or nearly insoluble in water solvents can also be used; however, for these materials, the inclusion of a surfactant is helpful. Thus when using o-dichlorobenzene in conjunction with 75/25 2,9-dichloroquinacridone/quinacridone solid solution, a tinctorially weak product is obtained, while the inclusion of 5% of a nonionic surfactant can lead to production of a full strength product based on a rubout in lithographic varnish. Other solvents such as n-hexanol, cyclohexanol, cyclohexanone, 2-pentanone and n-octyl alcohol yield pigmentary products which exhibit very good strength but small particle size compared to the product obtained when n-pentanol is used under similar conditions. Of course any of these solvents may be useful for growing larger particle size pigments with components which are easier to grow, such as unsubstituted quinacridone itself, for example, which are relatively more soluble.

In a preferred aspect of the present invention, the ingredients intended to become part of the final pigment, whether a single quinacridone component or a binary, tertiary or even quaternary solid solution are coground in a conventional ball mill, along with about 8 to 10%, based on the pigment, of an inorganic salt such as sodium sulfate to avoid possible explosivity of the generated mill powder, and the material ground to an aggregated low crystallinity material. Addition of sodium sulfate is not essential since the product is highly aggregated and not dusty.

Premilling, as used in this invention, means milling in the complete absence of liquids or, if liquids are used, such as a phase directing solvent, or a surface active agent, they are present in such small amounts or of such a nature that the pigment retains the characteristics of a powder.

Alternatively an aggregated low crystallinity quinacridone pigment can be obtained by dissolving certain crude quinacridones in concentrated sulfuric acid and drowning the solution into cold water. In either case, the low crystallinity highly aggregated pigment is tinctorially weak by rubout and as such not valuable.

The preferred method for use in this invention involves ball milling of a crude quinacridone or mixture of quinacridones in a conventional manner in the dry state followed by ball milling in dilute aqueous base, basified aqueous salt solution, or an aqueous basic salt solution containing a small amount of solvent in the presence or absence of particle size growth promoters or inhibitors. The small amount of solvent used is readily removed by steam distillation prior to or during the acid extraction operation which is typically employed after the milling and then properly disposed of or recovered if desired. If the second milling is omitted and the mixture is simply refluxed even in the presence of a surfactant, then acidified and the solvent distilled off, the present 75/25 2,9-dichloroquinacridone/quinacridone solid solution comes out dark in masstone and tinctorially weak, because the product has not undergone sufficient ripening.

The organic liquids should preferably be sufficiently volatile with steam to allow their complete elimination in connection with the acid extraction operation, during which any metal which has become associated with the pigment during milling is dissolved in hot dilute sulfuric acid. The liquid should not be corrosive to the mill and grinding elements and be chemically stable in water or aqueous base. A wide variety of solvents such as alcohols, ketones, hydrocarbons, chlorinated hydrocarbons, etc., are suitable. The particular solvent will vary with the nature of the pigment and particularly its solubility. Less expensive and non-toxic solvents are preferred. Since the amount of organic liquid used is comparatively low, about 5 to 25% on the weight of pigment, as a separate and distinct non-aqueous phase, recovery for reuse is generally not economical. The solvent can simply be distilled, condensed and disposed of.

The preferred pigments for use in the present invention are the quinacridones. The quinacridone pigments to which the present invention is applicable generally will consist essentially of quinacridones of the formula I.

formula II

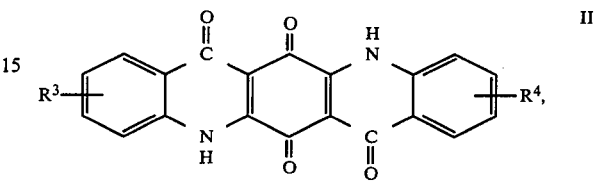

and mixtures thereof; and up to 15 wt. % but preferably up to 5% of a quinacridone of the formula III

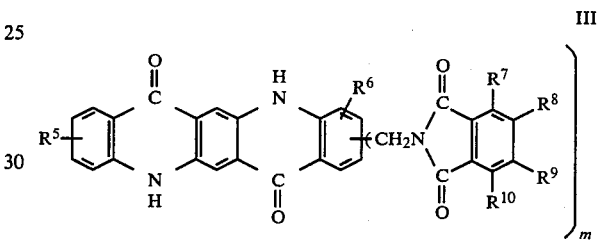

where $R^1$, $R^2$, $R^3$, $R^4$, $R^5$, $R^6$, are hydrogen, fluorine, chlorine, bromine, methyl, or methoxy; $R^7$, $R^9$, $R^{10}$, are hydrogen or chlorine; $R^8$ is hydrogen, chlorine, bromine, nitro, alkyl groups of 1 to 5 carbon atoms, alkoxy groups of 1 or 2 carbon atoms or benzoylamino, and m is an integer of from 1 to 4. When using a quinacridone of formula I where $R^1$ and $R^2$ are -H which is subject to an undesirable amount of particle growth in, for example, a mixture of dilute aqueous base and n-pentanol, the pigment particles will become undesirably large causing the product pigment to become opaque and low in tinctorial strength. By incorporating as little as 1.0 wt % of a quinacridone derivative of formula III with such a pigment, particle size growth is sufficiently inhibited to provide a product of attractive tinctorial characteristics in metallic finishes.

The language "consisting essentially of" is not intended to exclude the presence of minor amounts of other materials such as dihydroquinacridone or anilino acridone stabilizers, etc., but is intended to exclude the presence of significant quantities of other materials which would detract from the pigmentary character of the quinacridone pigment.

It is impossible to set up limits as to the length of the liquid milling step since it will vary depending on the particular quinacridone or mixtures of quinacridones being treated, the mill loading, and the type of mill being used. In order to establish the optimum length of time for milling a particular pigment under a given set of conditions, it is recommended that the invention be run with variations in both milling time and that samples of the finished product be compared with standard samples exhibiting the desired degree of pigment quality. A minimum of 4–6 hours is usually required in a commercial size mill but this may be extended to as much as 12-24 hours or even longer. Considerably longer times are required in laboratory scale or semi-works scale mills. Generally the liquid milling should be carried out at 10° to 60° C. with from 20° to 50° C. being preferred.

After the milling operation the pigment slurry is diluted with water, acidified to pH 1 to 1.5 and heated to steam distill off the solvent and dissolve any metal which wore off from the milling media during the dry as well as the wet milling operations. Following the extraction step the pigment is isolated by filtration, washed and dried.

The pigment particles produced by the present invention generally have a platelet-like shape whereas conventionally produced quinacridone pigments often are acicular in shape. The quinacridone pigments produced by the process of the present invention are more dispersible than conventional quinacridone pigments and due to their platelet-like shape, and the ability to control particle size, in combination with surface treatments disclosed in the examples, pigments produced by the process of the present invention have improved rheological properties when compared with previous quinacridone pigments. This is most evident in solid color stylings in the new high solids thermosetting acrylic enamels which have been developed for automotive use. Most of the previous quinacridone pigments are virtually unusable in these systems, because of high viscosity, in contrast, the quinacridone pigments prepared by the present invention are useful in these systems. The products also exhibit improved rheological properties in conventional thermosetting and thermoplastic systems.

In the past it has been difficult to obtain a satisfactory 2,9-dichloroquinacridone pigment or its solid solution with quinacridone for use in solid color stylings in high solids enamels. By using the present invention satisfactory pigments of the 75% 2,9-dichloroquinacridone and 25% quinacridone solid solution, the corresponding 90/10 solid solution or the 100% dichloroquinacridone are readily prepared for the new high solid enamels. An attractive 2,9-dimethylquinacridone pigment or its solid solution with quinacridone for use in a variety of systems can similarly be prepared. Other useful solid solution combinations can also be prepared.

The introduction of a particle size growth inhibitor leads to products of smaller particle size and if properly dispersed in an automotive topcoat either a thermosetting enamel or thermoplastic lacquer, to a finish of increased intensity and geometric metamerism (commonly called "two-tone" effect or "flip-flop"). This latter property is of particular esthetic value and manifests itself as a change in color depth and often hue as a function of viewing angle. The effect may be observed by slowly rotating a flat paint panel covered with a metallic finish from a normal to an obtuse angle. With increasing "two-tone" the color increases in depth as the viewing angle changes in any direction from normal. The greater "two-tone" effect observed with product particles ripened in the presence of 2-phthalimidomethylquinacridone is due to the generation of smaller particle size pigment which when properly dispersed exhibit less light scattering and increased "two-tone" effect. The greater degree of "two-tone" which is achieved with pigments prepared by the present process indicates that they have an effective smaller particle size, which is also confirmed by X-ray measurements, than products containing no pigment growth inhibitor or a lesser amount of the pigment growth inhibitor.

The resulting products treated with aluminum quinacridone sulfonate result in pigments of considerable "two-tone" and consequent esthetic appearance in conjunction with satisfactory rheological properties in thermosetting acrylic enamel systems.

DESCRIPTION OF THE PREFERRED EMBODIMENTS

In the following Examples, all parts are by weight.

EXAMPLE I

This example describes the preparation of dichloroquinacridone/quinacridone solid solution at two sodium hydroxide concentrations in the liquid milling step and both with and without the inclusion of a quaternary ammonium salt.

A semi-works scale ball mill is charged with 1000 parts of "Cyl-Pebs," steel cylinders approximately ½" (0.0127 m) in diameter and ½" (0.0127 m) in length, 100 parts of "twenty penny," 4" (0.1 m) nails, 30 parts of crude 2,9-dichloroquinacridone, 10 parts crude quinacridone and 4 parts anhydrous sodium sulfate. The mill is rotated at 40 rpm which is about 74% of the critical speed ("critical speed" is the speed at which centrifical force overcomes the force of gravity so that the grinding elements are retained against the outer wall of the mill) for 48 hours at 55°-60° C. The mill is opened and its contents discharged through a screen which retains the "Cyl-Pebs" and nails.

Then a portion of the resulting mill powder (0.029 part) is charged into a laboratory scale ball mill combining 1.32 parts ⅛" (0.0032 m) diameter steel shot 0.20 part of water, 0.034 part 50% aqueous sodium hydroxide and 0.0036 part n-pentanol. The mill is rotated at about 74% of its critical speed for 72 hours. The mill is discharged onto a screen which retains the steel shot. The shot is washed with water (about 0.4 part) so that essentially all of the pigment is collected as a slurry. The basic slurry is acidified with dilute sulfuric acid to neutralize the sodium hydroxide and bring the pH to about 1.3–1.5. Steam is passed through the slurry until the temperature reaches 87°–93° C. which causes the alcohol to steam distill off and the temperature is continued to be maintained for an hour at 87°–93° C. Then 0.006 part of alum is added followed by an aqueous slurry of 0.0011 part of quinacridone monosulfonic acid over a period of a half hour. This precipitates on the surface of the pigment about 4.3% aluminum quinacridone monosulfonate. Heating at 87°–93° C. is continued for another half hour. The product is isolated by filtration, washed with hot water until free of acid, and dried. Twenty-six thousandth of a part of the finished pigment is recovered.

Although the product has a somewhat larger particle size than a commercial counterpart, its rheological properties are far superior than would be expected. For a high solids enamel system it displays unusually attractive rheological properties. Relative to a product of smaller partice size with a broader particle size distribution, a high solids enamel mill base shows about 1/10 the yield stress (expressed in dynes/cm$^2$) and 3.6 fold decrease in viscosity when tested in a conventional manner in this automotive finish. This advantage is of particular importance in styling solid reds for automotive topcoat finishes.

When the same mill powder is milled in the aqueous medium exactly as described above but the sodium hydroxide concentration is reduced by about 50% (0.21 part water and 0.017 part 50% sodium hydroxide) and the procedure followed as described above, a smaller particle size product is obtained which though significantly better in rheology (millbase viscosity 2.6 fold lower) than a commercial product of the same composition, is rheologically inferior to the product prepared by milling at the higher base concentration.

When the aqueous milling at the lower base concentration is repeated but 0.002 part of a 44.4% solution of tributylbenzyl ammonium chloride in a mixture of water and hexylene glycol is included, and the rest of the procedure followed as shown above, a product is obtained which is significantly larger in particle size and thus lighter in masstone as shown by a rubout in a lithographic varnish. In a high solids enamel the product shows outstanding mill base rheology having a mill base viscosity about 41 fold lower than that of a commercial product of similar composition.

EXAMPLE II

This example illustrates a different way of obtaining aggregated low crystallinity quinacridone prior to the liquid milling step.

To 552 parts of concentrated sulfuric acid stirred at a temperature under 30° C. is added 37.5 parts of crude 2,9-dichloroquinacridone and 12.5 parts of crude quinacridone. Since the material fails to go entirely into solution, 184 parts of 100% sulfuric acid is added while maintaining the temperature under 30° C. After stirring for 15 minutes all of the material goes into solution. The resulting solution is added gradually over a period of a half hour to a stirred mixture of 2000 parts water, while maintaining the resulting slurry at 0°–10° C. The product is isolated by filtration, washed until acid free with water and dried. Forty-eight and one-half part of dry product is obtained.

The product is shot milled exactly as described in the first water pentanol milling in Example 1 at the same concentration to produce a pigment which was identical in tint and close in masstone to a product derived from a low crystallinity precursor prepared by the attrition milling technique. Prior to liquid milling, the product was weak and dull relative to the final pigment.

EXAMPLE III

This example illustrates the effect of ionic strength in the aqueous solution on alcohol separation and its effect on growing particles of the pigment.

Thirteen and two-tenth parts of mill powder prepared according to the procedure described in Example I is charged into a laboratory scale ball mill containing 600 parts ⅛" (0.0032 m) diameter steel shot, 95 parts of water, 7.7 parts of 50% sodium hydroxide and 1.63 parts of n-pentanol (A). In another similar run, 4.54 parts of anhydrous sodium sulfate was also included (B) before rolling the mill contents for 72 hours at about 74% of critical speed. In still a third milling, the water amount was lowered to 90 parts and the 50% sodium hydroxide increased to 15.4 parts (C).

All three millings are worked up in the fashion described in Example I. C & B closely approximate each other by rubout both in masstone and tint notwithstanding the large difference in sodium hydroxide concentration. A, on the other hand, is darker in masstone, indicating a product of smaller particle size. Thus the presence of sodium sulfate which brought the total ionic strength of the aqueous solution in B to the leval of C and produced products with equivalent tinctorial properties. While A which is milled in a medium having half the ionic strength and thus forced less n-pentanol out of aqueous solution produced a product of darker masstone and therefore smaller particle size.

EXAMPLE IV

This example illustrates the use of other alcohols.

Using the same mill powder and conditions of milling as well as work-up as set forth in Example III-A but replacing the n-amyl alcohol with (A) 1.63 parts 1-hexanol or
(B) 1.92 parts cyclohexanol Pigments A and B exhibit full tinctorial strength and are similar to each other in tint and masstone, both being significantly darker in masstone than the corresponding product milled in the presence of n-pentanol. The latter alcohol provides a more effective particle growth medium for this pigment.

EXAMPLE V

This example illustrates the use of an essentially water insoluble organic solvent.

Using the same mill powder and conditions of milling as well as work-up described in Example I (higher base concentration) but replacing the n-pentanol with 0.0057 part of o-dichlorobenzene and adding 0.0013 part of a nonionic surfactant, (product of condensation of p-nonylphenol and ethylene oxide), a product is obtained which is darker in masstone and somewhat stronger in tint relative to the product described in Example I. The process produces a pigment of full strength having a relatively small particle size.

EXAMPLE VI

This example shows the preparation of pigmentary 2,9-dichloroquinacridone with and without two different quaternary ammonium salts, and in the presence of 2-phthaliminomethylquinacridone in the liquid milling step.

A semi-works scale ball mill as used in Example I is charged with the same milling media used in Example I, but only 40 parts crude 2,9-dichloroquinacridone and 4 parts sodium sulfate. Milling and discharge was performed as described in Example I.

A portion of the resulting mill powder (0.12 part) is charged into a laboratory scale ball mill containing 5.29 parts ⅛" (0.0032 m) diameter steel shot, 0.84 part water, 0.14 part 50% aqueous sodium hydroxide, and 0.014 part n-pentanol. The mill is discharged onto a screen which retains the steel shot. The shot is washed with water (about 1.8 parts) so that essentially all the pigment is collected as a slurry.

The agitated slurry is acidified with dilute sulfuric acid to neutralize the base and bring the pH to about 1.3 to 1.5. The slurry is heated in an open beaker with steam until the temperature reaches 87°–93° C. and is maintained at that temperature for one hour. Then 0.02 part of alum is added followed by an aqueous slurry of 0.0044 part of quinacridone monosulfonic acid over a period of a half hour. Heating is continued at 87°–93° C. for another half hour. The product is isolated by filtration, washed with hot water until free of acid, and dried. Eleven hundredth part of the finished pigment is recovered.

The product exhibits excellent rheology in a high solids enamel system. Relative to a commercial product of similar color but different quinacridone composition and particle size the mill base shows 11.6 fold lower yield stress and a 5 fold decrease in viscosity when tested in an automotive high solids thermosetting system. This leads to a solid red styling of enhanced gloss and distinctness of image.

When the above aqueous milling is repeated except 0.0079 part of a 44.4% solution of tributyl benzyl ammonium chloride in a mixture of water and hexylene glycol is included, and the slurry worked up and the product isolated as described above, a product is obtained which is somewhat lighter in masstone (larger particle size) when tested by rubout in a lithographic varnish. In a high solids enamel this product shows even better rheology, having a mill base viscosity 7.5 fold lower than was obtained for the same product prepared in the absence of the tetralkyl ammonium halide. This tetralkyl ammonium chloride is a particularly attractive particle growth promoter since it is totally water soluble and can be washed away from the pigment surface to avoid any possible interference in subsequent use of the pigment in some end use systems. However, the particle size growth effect has also been demonstrated by the inclusion of other quarternary ammonium salts. Thus, by following the procedure described above in this example except including in the water organic liquid milling step, an amount of cetyl trimethyl ammonium chloride equivalent to 3.3% on basis of pigment, a product of similarly enhanced opacity in masstone is obtained.

Conversely, the inclusion of as little as 2% 2-phthalimidomethylquinacridone, on the basis of pigment, in the water/organic liquid milling step described above, produces a product which is significantly darker in masstone (smaller particle size) when evaluated by rubout in a lithographic varnish. Products of small particle size afford metallic finishes of greater "two-tone" which is highly valued for automotive finishes.

EXAMPLE VII

This Example illustrates a semi-works scale preparation of 90% 2,9-dichloroquinacridone/10% quinacridone solid solution.

A semi-works scale ball mill containing 975 parts $\frac{1}{8}''$ (0.0032 m) diameter steel shot is charged with 20 parts mill powder generated by the premilling procedure described in Example VI (but charging 36 parts of 2,9-dichloroquinacridone and 4 parts quinacridone to the mill), 107 parts water, 56 parts 30% sodium hydroxide, 1.23 parts n-pentanol and 0.45 parts of a 40% solution of benzyl tributyl ammonium chloride in a mixture of water and hexylene glycol. The mill is rotated at 40 rpm for 38 hours. The internal mill temperature is 30°–32° C.

The mill is opened and its contents discharged through a screen which retains the steel shot. The shot is washed with water so that essentially all of the pigment is collected as a slurry.

The basic slurry is acidified with dilute sulfuric acid to neutralize the sodium hydroxide and bring the pH to about 1.3–1.5. By means of steam, the slurry is heated to 87°–93° C., the alcohol is allowed to steam distill out and then the product is treated with alum and quinacridone monosulfonic acid slurry to precipitate on the surface about 4.3% aluminum quinacridone sulfonate as described in Example I. The slurry is maintained for about $\frac{1}{2}$ hour at 87°–93° C., and the pigment isolated by filtration, washing, and drying.

The pigment exhibits improved rheological properties in high solids enamel and exhibits excellent gloss and distinctness of image in a solid red automotive finish.

EXAMPLE VIII

This example illustrates the use of a ketone as the organic solvent phase.

Mill powder of 2,9-dichloroquinacridone prepared as described in Example VI is further milled as follows.

Thirteen and two-tenths parts of mill powder is charged into a laboratroy scale ball mill containing 600 parts $\frac{1}{8}''$ (0.0032 m) diameter steel shot, 90 parts water, 15.4 parts 50% aqueous sodium hydroxide, 3.24 parts of 2-pentanone and 0.6 part of a nonionic surfactant, Igepal CO-970 (a condensation product of nonylphenol and ethylene oxide).

The resulting slurry is worked up as described in Example I to yield 12.2 parts of a pigment which by rubout is closely matched in masstone and is practically identical in tint to the pigment described in Example I which was milled in the presence of n-pentanol.

EXAMPLE IX

This example illustrates the preparation of a 2,9-dimethylquinacridone/quinacridone solids solution with and without the use of a surfactant.

A semi-works scale ball mill is charged with 1000 parts of "Cyl-Pebs," steel cylinders approximately $\frac{1}{2}''$ (0.0127 m) in diameter and $\frac{1}{2}''$ (0.0127 m) in length, 100 parts of "twenty penny" 4" (0.1 m) nails, 36 parts crude 2,9-dimethylquinacridone, 4 parts of crude quinacridone and 4 parts anhydrous sodium sulfate. The mill is rotated at 40 rpm for 48 hours at 55°–60° C. The mill is opened and its contents discharged through a screen which retains the "Cyl-Pebs" and nails.

Then a portion of the resulting mill powder (0.29 part) is charged into a laboratory scale mill containing 10.57 parts of $\frac{1}{8}''$ (0.0032 m) diameter steel shot, 1.98 parts water, 0.34 part 50% sodium hydroxide, 0.01 part of the isopropylamine salt of dodecylbenzene sulfonic acid (surfactant) and 0.036 part n-pentanol. The mill is rotated for 72 hours at about 75% of its critical speed. The mill contents are discharged onto a screen which retains the steel shot. The steel shot is washed with water to collect all the dilute slurry from the mill. Total slurry volume is about 3 liters. In an open beaker the slurry is stirred and the pH adjusted to 1.3 to 1.5 by the addition of 33% sulfuric acid. Then steam is passed through the slurry and the temperature brought to 87°–93° C. and maintained at that temperature for one hour during which time the alcohol is steam distilled off. Then to the hot slurry is added a slurry of 0.0079 part 2-phthalimidomethylquinacridone in 0.088 part water and stirring and heating at 87°–93° C. continued for one hour. The product is isolated by filtration, washed with hot water until free of acid, and one portion dried at 80° C. In total twenty-six hundredth part of pigment is recovered. The product is a magenta pigment which is more transparent and similar in color to a commercial 2,9-dimethylquinacridone magenta but shows a signficant rheological advantage in an industrial alkyd system. In addition, the product shows excellent working properties and tinctorial attributes for a common universal colorant system.

The surfactant can be replaced by dodecylbenzene sulfonic acid itself with similar results. However, if the surfactant is left out, a larger particle size product which is somewhat more opaque but similar in tint is obtained. This product, without the surfactant, shows very good performance in conventional automotive thermosetting enamel systems.

EXAMPLE X

This Example illustrates the preparation of an orange solid solution quinacridone pigment.

A laboratory scale ball mill is charged with 1500 parts of ½" (0.0127 m) diameter steel balls, 150 parts roofing nails, 21 parts crude gamma quinacridone, 14.5 parts crude, 4,11-dichloroquinacridone, 9.5 parts crude quinacridonequinone, 5.0 parts 6,13-dihydroquinacridone, and 5.0 parts anhydrous sodium sulfate. The mill is rotated for 96 hours at about 75% of critical speed. The mill is opened and its contents discharged through a screen which retains the balls and nails.

Then a portion of the resulting mill powder (13.2 parts) is charged into a laboratory scale ball mill containing 600 parts ⅛" (0.0032 m) diameter steel shot, 95 parts of water, 7.7 parts 50% aqueous sodium hydroxide and 1.63 parts n-pentanol. The mill is rotated at about 74% of its critical speed for 72 hours. The mill is discharged onto a screen which retains the steel shot. The shot is washed with water (about 200 parts) so that essentially all of the pigment is collected as a slurry. The slurry is worked up as described in Example I including the treatment with 4.3% aluminum quinacridone sulfonate to yield 11.8 parts of an orange pigment.

The pigment is a match for a commercial grade product of similar composition in terms of X-ray pattern and color except that the masstone is lighter as a consequence of larger particle size.

By including 3%, on a pigment basis, of 2-phthalimidomethylquinacridone in the liquid milling step, a product is obtained which closely approximates the commercial grade product in masstone depth.

EXAMPLE XI

This illustrates the preparation of a transparent 60/40 quinacridone 2,9-dichloroquinacridone solid solution.

The mill and milling procedure described in Example X are used to co-mill 30 parts crude gamma quinacridone, 20 parts crude 2,9-dichloroquinacridone, and 5 parts anhydrous sodium sulfate.

The resulting mill powder is milled in dilute aqueous base in the presence of n-pentanol as described in Example X, but in milling mixture is also included 2% by weight based on pigment of 2-phthalimidomethylquinacridone. To moderate growth inhibition, less additive can be added or 4% based on pigment weight of a nonionic surfactant such as Igepal® CO-970 can be included. The work-up and surface treatment is the same as described in Example I.

In a modern high solids enamel system the resulting pigment provides a mill base which shows about a 3 fold decrease in viscosity relative to existing commercial quinacridone pigments of similar color.

EXAMPLE XII

This Example illustrates the preparation of a pigmentary beta quinacridone product.

The mill described in Example X is used to mill 50 parts crude beta quinacridone with 5 parts anhydrous sodium sulfate for 72 hours.

The resulting mill powder is milled in dilute aqueous base in the presence of n-pentanol as described in Example X but in the milling mixture is included 4% by weight 2-phthalimidomethylquinacridone.

The mill is discharged as described in Example X and the aqueous slurry acidified with dilute sulfuric acid to pH 1.3 to 1.5 and then the steam is passed through the agitated slurry and the temperature allowed to rise to 87°–93° C. The slurry is heated at this temperature for two hours. The product is isolated by filtration, and is washed with hot water until acid free. After drying at 80° C., a violet powder is obtained. By rubout the product is strong in tint and somewhat lighter in masstone vs. a current beta quinacridone commercial product.

EXAMPLE XIII

This Example illustrates the preparation of a pigmentary gamma quinacridone product.

The mill described in Example X is used to mill 50 parts gamma quinacridone with 5 parts anhydrous sodium sulfate and 2 parts dimethyl formamide, as a phase controlling solvent, for 40 hours.

The resulting mill powder is milled in dilute aqueous base in the presence of n-pentanol and 2-phthalimidomethylquinacridone as described in Example XII. Extraction was carried out as described in Example XII.

When incorporated into a lithographic varnish the gamma quinacridone product is stronger in tint and somewhat more opaque in masstone vs. a current commercial gamma quinacridone product.

I claim:

1. A process for the preparation of finished pigment which consists essentially of a quinacridone or quinacridone of the formula

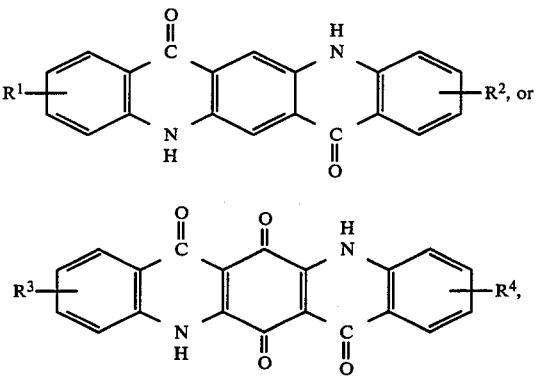

and solid solutions or mixtures thereof, with up to 15 wt. % of a quinacridone of the formula

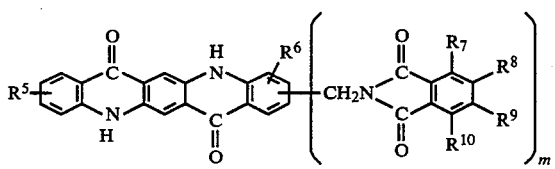

where $R^1$, $R^2$, $R^3$, $R^4$, $R^5$, and $R^6$ are hydrogen, fluorine, chlorine, bromine, methyl or methoxy; $R^7$, $R^9$, and $R^{10}$ are hydrogen or chlorine; and $R^8$ is hydrogen, chlorine, bromine, nitro, alkyl groups of 1 to 5 carbon atoms, alkoxy groups of 1 or 2 carbon toms or benzoylamine, and m is an integer of from 1 to 4, from crude precursors by converting the crude precursor therefor to a low crystallinity aggregated form, followed by milling the low crystallinity pigment in water having a pH from 7 to 14 and from 5 to 25% by weight, based on pigment, of a separate phase comprising an organic liquid which is effective in improving the crystallinity of the pigment particles and recovering a pigmentary grade product.

2. The process of claim 1 wherein the aggregated low crystallinity is prepared by dissolving crude pigment in concentrated sulfuric acid followed by drowning the solution in water to precipitate an aggregated low crystallinity composition.

3. The process of claim 1 wherein the aggregated low crystallinity pigment is prepared by dry ball milling a crude pigment.

4. The process of claim 3 wherein water has a pH of 9 to 13.5.

5. The process of claim 4 wherein the organic liquid is selected from alcohols having from 4 to 8 carbon atoms, ketones having from 5 to 8 carbon atoms and halogenated aromatic compounds containing 6 to 8 carbon atoms.

6. The process of claim 1 wherein the organic liquid is pentanol.

7. The process of claim 6 wherein the quinacridone consists essentially of 2,9-dimethylquinacridone and up to 5% by weight phthalimidomethylquinacridone.

8. The process of claim 6 wherein the quinacridone consists essentially of 2,9-dichloroquinacridone and up to 5% by weight phthalimidomethylquinacridone.

9. The process of claim 6 wherein the quinacridone is a solid solution consisting essentially of 2,9-dimethylquinacridone, quinacridone, and up to 5% by weight phthalimidomethylquinacridone.

10. The process of claim 9 wherein the quinacridone is prepared in the presence of 0.5 to 10% by weight, based on quinacridone, of benzyl tributyl ammonium chloride.

11. The process of claim 6 wherein the quinacridone is a solid solution consisting essentially of 2,9-dichloroquinacridone, quinacridone, and up to 5% by weight phthalimidomethylquinacridone.

12. The process of claim 11 wherein the quinacridone is prepared in the presence of 0.5 to 10% by weight, based on quinacridone, of benzyl tributyl ammmonium chloride.

13. The process of claim 1 wherein the quinacridone is prepared in the presence of 0.5 to 10% by weight, based on quinacridone, of benzyl tributyl ammonium chloride.

* * * * *